US012687235B2

(12) United States Patent
Armas et al.

(10) Patent No.: US 12,687,235 B2
(45) Date of Patent: Jul. 21, 2026

(54) ELECTRO-HYDRAULIC VALVE COVER AND METHOD OF USE

(71) Applicants: David Armas, Homestead, FL (US); Joel Merino, Homestead, FL (US); Jeshua Armas, Homestead, FL (US)

(72) Inventors: David Armas, Homestead, FL (US); Joel Merino, Homestead, FL (US); Jeshua Armas, Homestead, FL (US)

( * ) Notice: Subject to any disclaimer, the term of this patent is extended or adjusted under 35 U.S.C. 154(b) by 34 days.

(21) Appl. No.: 18/759,100

(22) Filed: Jun. 28, 2024

(65) Prior Publication Data

US 2026/0002602 A1     Jan. 1, 2026

(51) Int. Cl.
  *F16K 27/12*     (2006.01)
  *F16K 31/02*     (2006.01)

(52) U.S. Cl.
  CPC .............. *F16K 27/12* (2013.01); *F16K 31/02* (2013.01)

(58) Field of Classification Search
  CPC ................................ F16K 27/12; F16K 31/02
  USPC .................... 137/343, 246.19, 375, 377, 378
  See application file for complete search history.

(56) References Cited

U.S. PATENT DOCUMENTS

| | | | | |
|---|---|---|---|---|
| 4,944,486 | A * | 7/1990 | Babitzka | H01F 7/1607 239/585.4 |
| 6,012,655 | A * | 1/2000 | Maier | F02M 51/0682 239/585.4 |
| 6,481,646 | B1 * | 11/2002 | Hornby | F02M 51/005 285/305 |
| 7,637,443 | B2 * | 12/2009 | Scheffel | F02M 51/061 239/585.1 |
| 7,854,400 | B2 * | 12/2010 | Stier | F02M 51/061 251/129.21 |
| 9,033,264 | B2 * | 5/2015 | Stier | F02M 61/168 251/129.21 |
| 2006/0180783 | A1 * | 8/2006 | Tackes | F16K 31/0668 251/129.15 |
| 2006/0214126 | A1 * | 9/2006 | Kimble | F16K 31/0655 251/129.21 |
| 2006/0266965 | A1 * | 11/2006 | Everett | F16K 31/0682 251/129.02 |
| 2010/0294966 | A1 * | 11/2010 | Czimmek | F02B 39/00 251/129.15 |
| 2021/0332909 | A1 * | 10/2021 | Yoshimura | F16K 31/0627 |

* cited by examiner

*Primary Examiner* — Minh Q Le
(74) *Attorney, Agent, or Firm* — Mark C. Johnson; Johnson | Dalal

(57)     ABSTRACT

An electro-hydraulic valve cover that is made of a water-resistant material enclosing a cover cavity with the at least one electronic port encapsulated therein, having a perimeter surface selectively removably and directly coupled to the valve housing in a watertight configuration, and having a wire member defining a wire channel spanning from the cover cavity and conforming to the wire, wherein the electro-hydraulic valve cover is configured to shield an electrical connection associated with one or more electro-hydraulic valve(s) in a hydraulic assembly from harsh conditions and prevent damage, corrosion, bad contacts, and shorts.

14 Claims, 3 Drawing Sheets

ELECTRO-HYDRAULIC VALVE COVER AND METHOD OF USE

FIELD OF THE INVENTION

The present invention relates generally to hydraulic systems with electronically controlled valves and, more particularly, relates to covering the electronically controlled valves on a hydraulic system from damage and environmental elements.

BACKGROUND OF THE INVENTION

The set-up and configuration of hydraulic systems are well known. Hydraulic systems with electronically controlled valves generally include a hydraulic cylinder with a push-rod and/or piston, a reservoir with a liquid used for pneumatic operation, a pump, and a valve manifold or other housing body that encapsulates electronically controlled valves utilized for the operation of the hydraulic system. The valve manifold typically includes one or more electrical connectors and one or more ports for attaching conduits for facilitating liquid flow. Electro-hydraulic valves are electrically operated valves that control how hydraulic fluid is sent to actuators within a hydraulic system. Electro-hydraulic valves are widely used in many hydraulic systems across several industries, including aerospace, manufacturing, and construction, etc. Electro-hydraulic valves used in construction equipment applications are often exposed to harsh weather conditions, moisture, dirt, debris, and hydraulic oil. These conditions can lead to issues with the electrical connection on the electro-hydraulic valves, such as a short, a bad connection/contact, corrosion, or damage to the connection pins/contacts. Electro-hydraulic valves with on-board electronics typically have their circuitry tucked away within a housing which protects the circuitry from said environmental conditions, however, the electrical connections on the electro-hydraulic valves remain exposed to those conditions.

Therefore, a need exists to overcome the problems with the prior art as discussed above.

SUMMARY OF THE INVENTION

The invention provides an electro-hydraulic valve cover and method of use that overcomes the hereinafore-mentioned disadvantages of the heretofore-known devices and methods of this general type and that provides protection for an electro-hydraulic valve's electrical connection from moisture, dirt, debris, hydraulic oil, corrosion, and various weather conditions. To effectuate the same, a specialized cover is utilized that shields the electrical connection(s) from harsh conditions and prevents damage, corrosion, bad contacts, and shorts. The cover may be made with any weather-resistant material and can be molded to fit all existing electrical connection types, e.g., Deustch, DIN, M5, M12, etc.

With the foregoing and other objects in view, there is provided, in accordance with the invention, a electro-hydraulic valve cover and method of use is disclosed in conjunction with a hydraulic assembly having at least one electro-hydraulic valve disposed within a valve housing and communicatively coupled to at least one electronic port and having at least one electrical connector with a wire electrically coupled thereto, wherein the at least one electrical connector coupled to the at least one electronic port. In one embodiment, an improvement to the assembly includes an electro-hydraulic valve cover of a water-resistant material enclosing a cover cavity with the at least one electronic port encapsulated therein, having a perimeter surface selectively removably and directly coupled to the valve housing in a watertight configuration, and having a wire member defining a wire channel spanning from the cover cavity and conforming to the wire.

In accordance with a further feature of the present invention, the wire channel is the sole aperture accessible to the cover cavity when the electro-hydraulic valve cover is coupled to the valve housing.

In accordance with another feature of the present invention, the wire member protrudes from the hydraulic valve cover.

In accordance with another feature, an embodiment of the present invention includes the hydraulic valve cover further having a rear wall and a sidewall surrounding the rear wall, wherein the rear wall and the sidewall define the cover cavity. Further, the wire member may protrude from the sidewall of the hydraulic valve cover.

In accordance with another feature of the present invention, the water-resistant material is a flexible polymeric material.

In accordance with yet another feature of the present invention, the perimeter surface is defined by a terminal edge of the electro-hydraulic valve cover.

Also in accordance with the present invention, a method of protecting an electro-hydraulic valve in a hydraulic assembly is disclosed that includes providing a hydraulic assembly having at least one electro-hydraulic valve disposed within a valve housing and communicatively coupled to at least one electronic port and having at least one electrical connector with a wire electrically coupled thereto, providing an electro-hydraulic valve cover of a water-resistant material enclosing a cover cavity, having a perimeter surface, and having a wire member defining a wire channel spanning from the cover cavity, inserting the wire through the wire channel, into the cover cavity and coupling the electrical connector to the at least one electronic port, and directly coupling the perimeter surface to the valve housing in a watertight configuration with the at least one electronic port encapsulated within the cover cavity.

In further embodiments of the present invention, the electro-hydraulic valve cover is selectively removably coupled to the valve housing.

Although the invention is illustrated and described herein as embodied in a electro-hydraulic valve cover and method of use it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not necessarily drawn to scale but, where applicable, may be utilized to support a particular structural configuration or geometric relationship between components utilized in the assembly.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the electro-hydraulic valve cover, or spanning from a lower end of the cover to an upper end of the cover.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figures 1, 2, 3, 4:
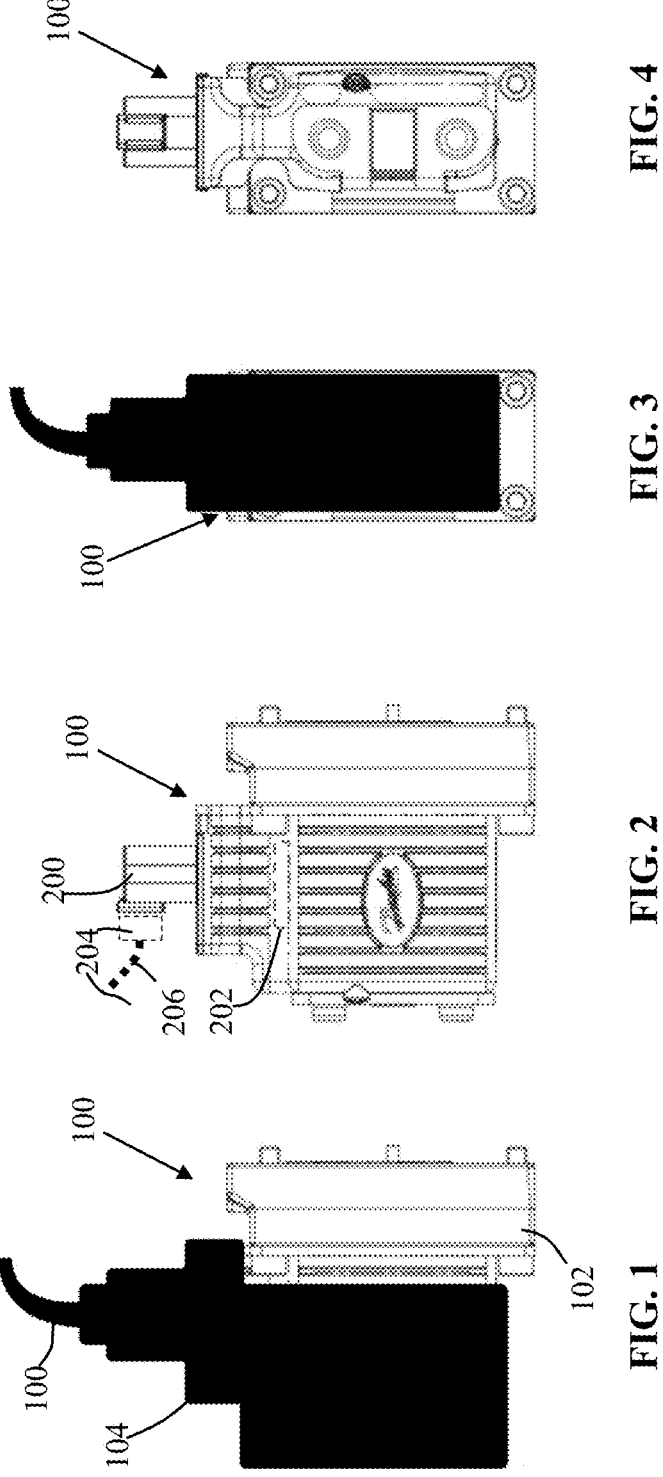
FIGS. 1-4 depict elevational views of an electro-hydraulic valve cover coupled and uncoupled to a hydraulic assembly to protect an electro-hydraulic valve disposed therein in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient electro-hydraulic valve cover and method of use that effectively and efficiently protects an efficient electro-hydraulic valve from the elements, thereby prolonging and maintaining its longevity, along with the corresponding machine operably coupled thereto.

Referring now to FIGS. 1-4 and FIG. 5, embodiments of the present invention are shown. The figures show several advantageous features of the present invention, but, as will be described below, the invention can be provided in several shapes, sizes, combinations of features and components, and varying numbers and functions of the components. As set forth herein, the electro-hydraulic valve cover 104 is designed to work in connection with a hydraulic assembly 100 having at least one electro-hydraulic valve 202 disposed within a valve housing 102, wherein the at least one electro-hydraulic valve 202 is communicatively coupled to at least one electronic port 200. The electronic port 200 will practically have at least one electrical connector 204 electrically and/or communicatively coupled thereto. The electronic port 200 serves as an electronic interface between an electronic connector and the electro-hydraulic valve. Said another way, the electronic port 200 and electrical connector 204 are designed to correspond and communicate with one another and may be of a configuration that includes a Deustch connection, DIN connection, M5 connection, M12 connection, etc.). The electrical connector 204 includes a wire 206 electrically coupled thereto that may be coupled to a computer or other electrical component in the hydraulic assembly 100.

The electro-hydraulic valve cover 104 is a body that is made of a water-resistant material enclosing a cover cavity 500 shaped and sized to receive the one or more electronic port(s) 200 that may be encapsulated therein when coupled to the valve housing 102 (as seen depicted in FIG. 1 and FIG. 3). In one embodiment, the hydraulic valve cover 104 is formed with a rear wall 504 and a sidewall 506 surrounding the rear wall 504, wherein the rear wall 504 and the sidewall 506 define the cover cavity 500. The hydraulic valve cover 104 may consist of a plurality of walls and may be formed as an oblong shape and is preferably shaped and sized to conform with the portion of the valve housing 102 defining the one or more electronic port(s) 200. As used herein, the term "wall" is intended broadly to encompass continuous structures, as well as, separate structures that are coupled together so as to form a substantially continuous external surface.

The material of the electro-hydraulic valve cover 104 may be made with a flexible and/or elastic polymeric material. In one embodiment, the material of the electro-hydraulic valve cover 104 is a urethane, polyethylene, polypropylene, or polyvinyl chloride (PVC) material. The material may have a commercially known high resistance to fire and chemicals, and will be capable of maintaining its shape and durability in temperatures from −55° C. up to 105° C. The material preferably has a flexural modulus ranging from 0.0260 to 10.0 GPa, or 3.77 to 1450 ksi.

Figure 5:
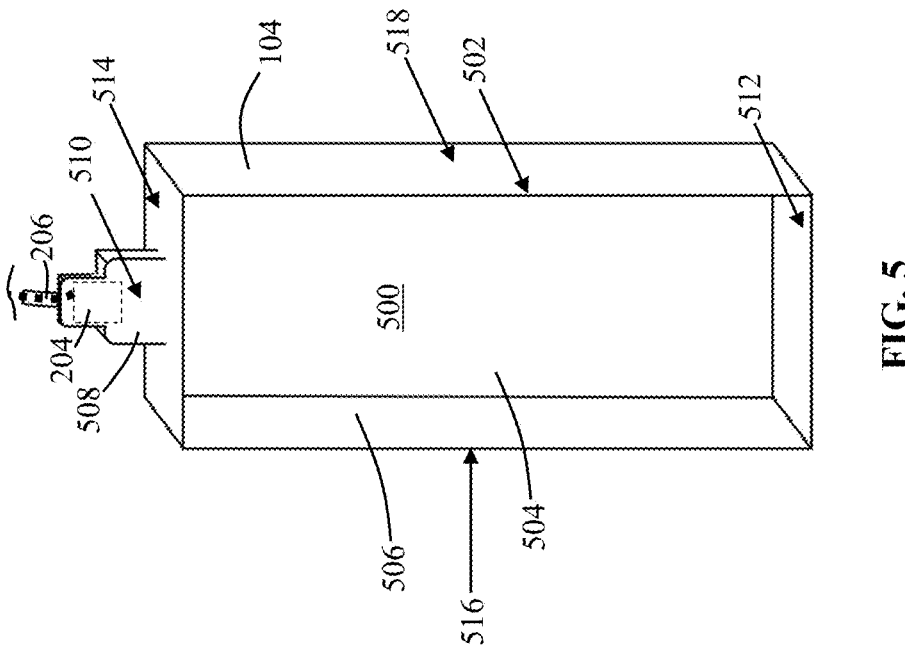
FIG. 5 is a perspective view of an electro-hydraulic valve cover in accordance with another embodiment of the present invention.

The electro-hydraulic valve cover 104 also includes a perimeter surface 502, which is preferably the terminal edge of the electro-hydraulic valve cover 104. The perimeter surface 502 is selectively removably and directly coupled to the valve housing 102 in a watertight configuration to effectively protect the electronic port 200 and corresponding electro-hydraulic valve 202. The electro-hydraulic valve cover 104 also includes a wire member 508 defining a wire channel 510 spanning from the cover cavity 500 and that conforms (i.e., is shaped and/or sized to receive) to the wire 206. In one embodiment, the inherent properties of the electro-hydraulic valve cover 104 enable the wire member 508 to compressively retain the wire 206. In one embodiment, the wire channel 510 is the sole aperture accessible to the cover cavity 500 when the electro-hydraulic valve cover 104 is coupled to the valve housing 102 to minimize access to the cover cavity 500 and exposure of the electronic port 200 and corresponding electro-hydraulic valve 202 to the elements. As seen in FIGS. 1-2 and FIG. 5, the perimeter surface 502 defines an opening on the electro-hydraulic valve cover 104 where the valve housing 102 is inserted therethrough, wherein the electro-hydraulic valve cover 104 is only partially coupled to the valve housing 102, but the electronic port 200 located on the valve housing 102 is encapsulated by the valve cover 104 and configured to receive the electrical connector 204.

In one embodiment, the wire member 508 protrudes from the hydraulic valve cover 104 approximately 2-8 cm to provide sufficient space for the wire 206. Further, the wire member 508 can be seen protruding from one end of the sidewall 506 of the hydraulic valve cover 104. The hydraulic valve cover 104 has a lower end 512 and an upper end 514 opposing the lower end 512 and can also be seen having two opposing sides 516, 518. The sidewall 506 and rear wall 504 may be substantially planar and the sidewall 506 may project from the rear wall 504 a uniform length until reaching the terminal edge of the electro-hydraulic valve cover 104 (as depicted best in FIG. 5).

Figure 6:
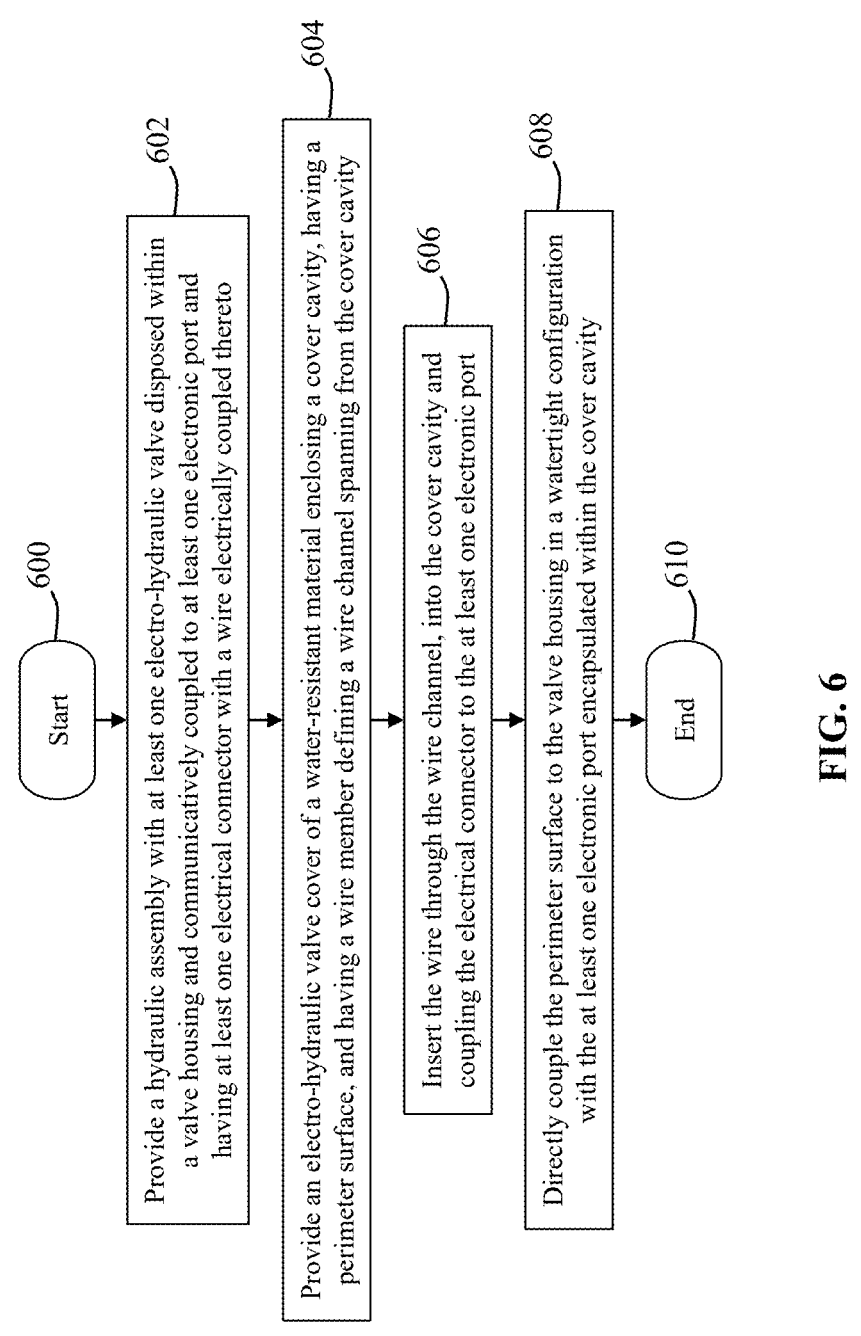
FIG. 6 depicts a process flow diagram illustrating a method of protecting an electro-hydraulic valve in a hydraulic assembly in accordance with one embodiment of the present invention.

FIGS. 1-5 can also be described in conjunction with the process flow chart of FIG. 6. Although FIG. 6 shows a specific order of executing the process steps, the order of executing the steps may be changed relative to the order shown in certain embodiments. Also, two or more steps shown in succession may be executed concurrently or with partial concurrence in some embodiments. Certain steps may also be omitted in FIG. 6 for the sake of brevity. In some embodiments, some or all of the process steps included in FIG. 6 can be combined into a single process.

The process of protecting an electro-hydraulic valve 202 in a hydraulic assembly 100 may begin at step 600 and immediately proceed to the step 602 of providing a hydraulic assembly 100 having at least one electro-hydraulic valve 202 disposed within a valve housing 102 and communicatively coupled to at least one electronic port 200 and having at least one electrical connector 204 with a wire 206 electrically coupled thereto. Next, step 604 includes providing an electro-hydraulic valve cover 104 of a water-resistant material enclosing a cover cavity 500, having a perimeter surface 502, and having a wire member 508 defining a wire channel 510 spanning from the cover cavity 500. Next, step 606 includes inserting the wire through the wire channel, into the cover cavity 500 and coupling the electrical connector 204 to the at least one electronic port 200 to provide an electrical and/or communication connection. Next, step 608 includes directly coupling the perimeter surface 502 to the valve housing 102 in a watertight configuration with the at least one electronic port 200 encapsulated within the cover cavity 500. In some embodiments, the electro-hydraulic valve cover 104 may be selectively removably coupled to the valve housing 102. The process may terminate at step 610.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. In combination with a hydraulic assembly having at least one electro-hydraulic valve disposed within a valve housing and communicatively coupled to at least one electronic port located on the valve housing and having at least one electrical connector with a wire electrically coupled thereto, the at least one electrical connector coupled to the at least one electronic port, wherein the improvement comprises:

an electro-hydraulic valve cover of a water-resistant material, with a rear wall, with a plurality of sidewalls enclosing a cover cavity defined by plurality of sidewalls and the rear wall, defining an opening with a perimeter surface defined by the plurality of sidewalls, with the at least one electronic port on the valve housing encapsulated by the electro-hydraulic valve cover, and having the perimeter surface selectively removably and directly coupled to the valve housing in a watertight configuration with the valve housing partially disposed in the opening and the cover cavity.

2. The improvement according to claim 1, wherein the wire channel is the sole aperture accessible to the cover cavity when the electro-hydraulic valve cover is coupled to the valve housing.

3. The improvement according to claim 1, wherein the electro-hydraulic valve cover further comprises:

a wire member defining a wire channel spanning from the cover cavity and conforming to the wire.

4. The improvement according to claim 3, wherein wire member protrudes from the hydraulic valve cover.

5. The improvement according to claim 3, wherein the electro-hydraulic valve cover further comprises:

a wire member protruding from the sidewall of the hydraulic valve cover and defining a wire channel spanning from the cover cavity and conforming to the wire.

6. The improvement according to claim 1, wherein the water-resistant material is a flexible and elastomeric polymeric material.

7. The improvement according to claim 1, wherein the perimeter surface is defined by a terminal edge of the electro-hydraulic valve cover.

8. A method of protecting an electro-hydraulic valve in a hydraulic assembly comprising the steps of:

providing a hydraulic assembly having at least one electro-hydraulic valve disposed within a valve housing and communicatively coupled to at least one electronic port located on the valve housing and having at least one electrical connector with a wire electrically coupled thereto;

providing an electro-hydraulic valve cover of a water-resistant material, with a rear wall, with a plurality of sidewalls enclosing a cover cavity defined by plurality of sidewalls and the rear wall, and defining an opening with a perimeter surface defined by the plurality of sidewalls;

inserting the valve housing into the cover cavity through the opening to partially cover the valve housing and encapsulate the at least one electronic port on the valve housing;

coupling the electrical connector to the at least one electronic port; and directly coupling the perimeter surface to the valve housing in a watertight configuration.

9. The method according to claim 8, wherein the electro-hydraulic valve cover is selectively removably coupled to the valve housing.

10. The method according to claim 8, further comprising:

providing the electro-hydraulic valve cover with a wire member defining a wire channel spanning from the cover cavity; and inserting the wire through the wire channel.

11. The method according to claim 10, the wire channel is the sole aperture accessible to the cover cavity when the electro-hydraulic valve cover is coupled to the valve housing.

12. The method according to claim 8, wherein the water-resistant material is a flexible and elastomeric polymeric material.

13. The improvement according to claim 1, wherein the electro-hydraulic valve cover is of a monolithic body.

14. The method according to claim 8, wherein the electro-hydraulic valve cover is of a monolithic body.

* * * * *